United States Patent [19]

Henzinger et al.

[11] Patent Number: 5,956,758
[45] Date of Patent: Sep. 21, 1999

[54] METHOD FOR DETERMINING TARGET ADDRESS OF COMPUTED JUMP INSTRUCTIONS IN EXECUTABLE PROGRAMS

[75] Inventors: Monika H. Henzinger, Menlo Park; Sanjay Ghemawat, Mountain View, both of Calif.

[73] Assignee: Digital Equipment Corporation, Maynard, Mass.

[21] Appl. No.: 08/962,506

[22] Filed: Oct. 31, 1997

[51] Int. Cl.$^6$ ................................................. G06F 9/355
[52] U.S. Cl. ............................................................. 711/213
[58] Field of Search ........................... 395/704; 711/213, 711/220; 712/233

[56] References Cited

U.S. PATENT DOCUMENTS

5,428,786  6/1995  Sites ........................................... 395/709
5,471,597  11/1995 Byers et al. ............................... 711/215
5,507,030  4/1996  Sites ........................................... 395/704

*Primary Examiner*—Kenneth S. Kim
*Attorney, Agent, or Firm*—Fenwick & West LLP

[57] ABSTRACT

A computerized method for determining destination addresses of an indirect computed branch instruction first locates a prolog sequence of instructions immediately preceding the indirect computed branch instruction using scanning. Candidate registers which may be used to index into the jump table are located. For each candidate register, a range of index values is determined. If the range of index values is contiguous for a specific candidate register, the register is selected as the index register. Using the index register, and a base register storing the location of the jump table, possible destination addresses stored in entries of the jump table are extracted.

16 Claims, 7 Drawing Sheets

METHOD FOR DETERMINING TARGET ADDRESS OF COMPUTED JUMP INSTRUCTIONS IN EXECUTABLE PROGRAMS

FIELD OF THE INVENTION

This invention relates generally to analyzing programs, and more particularly to statically determining indirect target addresses that will be computed when the programs are executed.

BACKGROUND OF THE INVENTION

Many program analysis tools operate on a control flow graph (CFG) of procedures of a program. For example, CFGs can reveal optimization opportunities or programming errors. A control flow graph includes nodes and directed edges. The nodes represent fundamental executable elements of the procedure, for example, basic blocks. The directed edges usually represent non-linear execution flows between the elements due to instructions such as branches and jumps.

An exact CFG which accurately represents a procedure is hard to generate when the procedure includes computed jumps. A computed jump typically is some type of branch instruction whose target address is not known until the program executes. Typically, the target address is the result of some computation that may be highly dependent on a dynamic state of the machine. Such jumps arise frequently, e.g, in the implementation of switch or case statements in a programming language.

Generally, the CFG for a procedure is built by first identifying the basic blocks of the procedure. A basic block is a linear sequence of instructions such that all branches into the basic block go to the first instruction, and only the last instruction branches out of the basic block. Typically, a basic block will terminate with a branch instruction that can direct the linear execution flow to some new target address from which the linear fetching continues.

In most modern processors such as the Digital Alpha processor, two kinds of computed branches are supported: direct and indirect. The destination of a direct branch is trivial to compute: an offset encoded in the instruction is added to the address of the branch instruction, see for example, U.S. Pat. No. 5,428,786 "Branch execution via backward symbolic execution" issued to Sites on Jun. 27, 1995.

An indirect computed branch jumps to an address stored in a processor register. This address was computed in previously executed instructions by using an index value to read the address out of a jump table that stores destination addresses for each possible index value. Alternatively, the destination was computed by adding a small multiple of an index value to a base address. This execution flow is more difficult to unravel. Particularly, when the range of index values is only known with certainty at run-time, and the location (base address) and structure of the jump table is also unknown.

Prior approaches can work on source programs when the possible destinations of a computed jump are made apparent by the structure of the language or program annotations. Object code can be analyzed in the case where the compiler can emit additional information. Many compilers do not provide the additional information.

Therefore, it is desired to provide a method for determining target addresses of computed jumps in executable code. Then, the method is totally independent of the technique used to generate the code.

SUMMARY OF THE INVENTION

A computerized method is provided for determining destination addresses of an indirect computed branch instruction of an executable program. The method locates a prolog sequence of instructions immediately preceding the indirect computed branch instruction. Candidate registers that may hold the index value are identified in the prolog.

For each candidate register, a range of index values is determined using a forward symbolic execution of the prolog. If the range is contiguous for a specific candidate register, then the register is selected as the index register. The address of the jump table is determined by identifying a base register. The possible values of the selected index register are added to the base address so that possible destinations of the computed branch can be determined to, for example, construct a control flow graph.

DETAILED DESCRIPTION OF PREFERRED EMBODIMENTS

Our method identifies possible destination addresses of indirect branches that correspond to computed jumps via a jump table, for example, executable instructions that implement source code switch or case statements. These addresses can be used to complete missing portions of a control flow graph.

Figure 1:
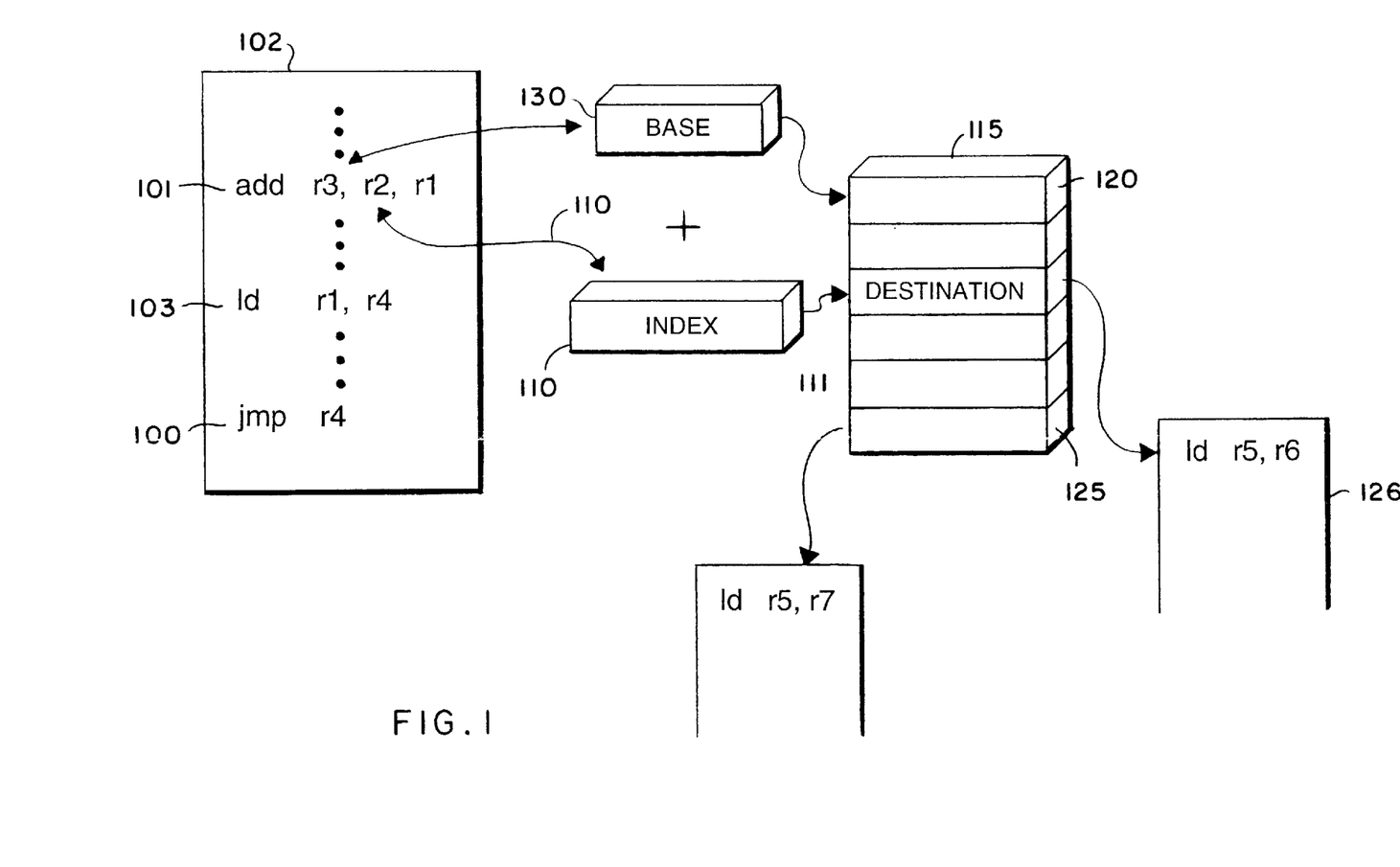
FIG. 1 is a flow diagram of a computed indirect execution flow through a jump table analyzed according to the invention.

As shown in FIG. 1, an indirect computed jump instruction 100 typically uses an index register 110 specified as an operand in one of the previous instructions, e.g., r2 in instruction 101. The index register 110 stores a value selected from a small interval of integers, e.g., the range of 0 to 10. The integer value is used to index (111) into a jump-table 115 stored at a base address. Alternatively, a small multiple of the index value register value is added to a base address.

The jump table stores a list of destination or target addresses at entries 120–125. In other words, the value stored in the index register r2 is added to the value of the base register r3 to access one of the entries 120–125 by the load instruction 103. The target addresses determine the next instruction 126 to fetch, for example, a "ld" or any other instruction. It should be noted that in executable code, the jump table has an unknown structure, for example, the entries 120–125 could be 8-bit bytes, 32-bit words, or 64-bit long-words. The table could be located anywhere in memory.

Figure 2:
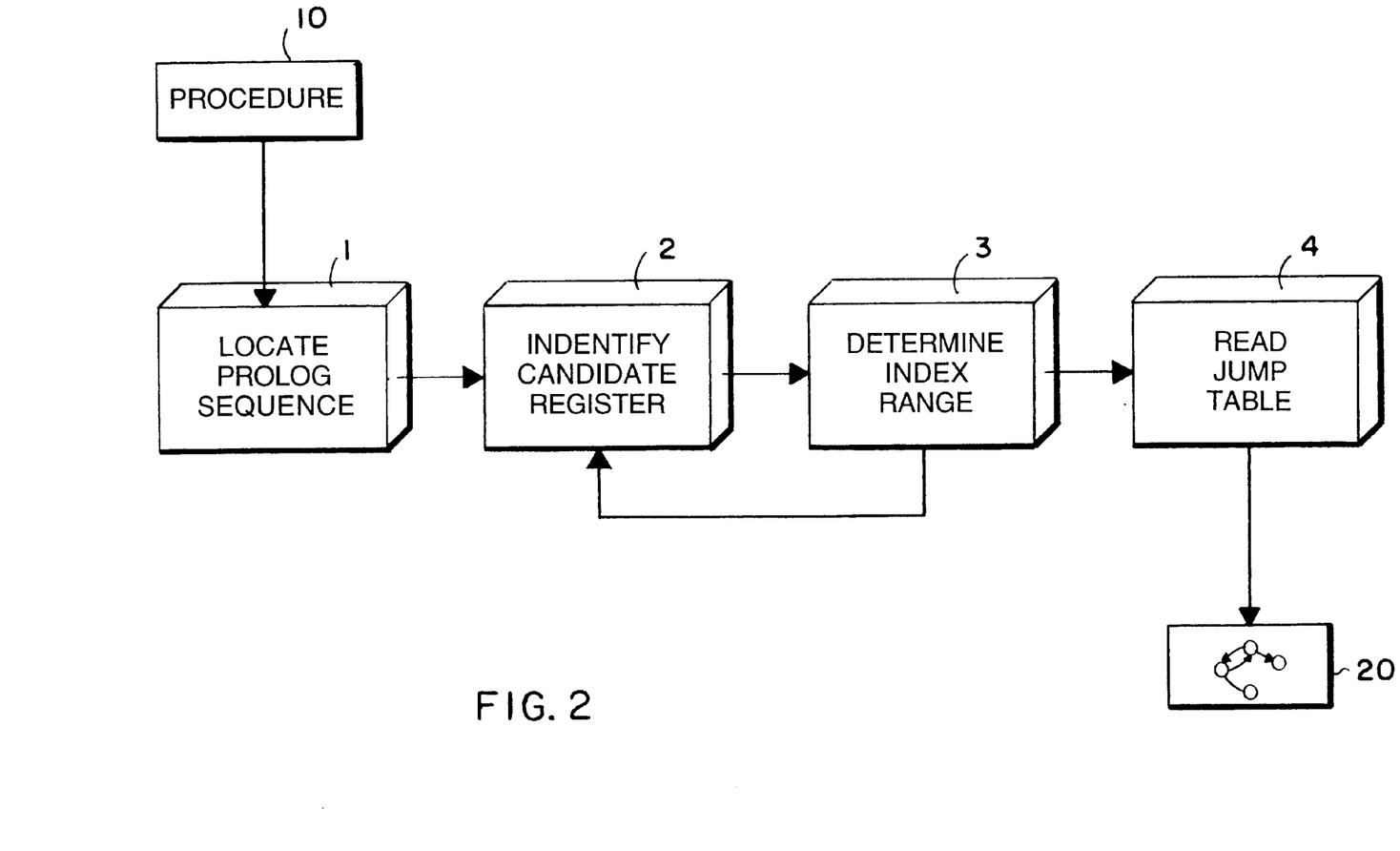
FIG. 2 is a flow diagram of a preferred analysis method.

As shown in FIG. 2, our analysis includes, at a high level, steps 1–4. The input to step 1 is a procedure 10 of a program where we locate the sequence of instructions 102 that lead to the indirect branch 100 (step 1). Next, we identify candidate index registers 110 (step 2). Then, the range of possible values which can be stored in the index register is identified (step 3). If the ranges can not be resolved in step 3, step 2 can be repeated with another candidate register. The jump table 115 is located, and the appropriate entries of the jump table are read to identify possible destinations for the indirect jump (step 4). This information can be used to complete a control flow graph 20. These steps are described in more detail below.

Step 1—Locate Prolog

The sequence of instructions 102 leading up to the branch instruction must have the property that each instruction in the sequence 102, except for the first instruction, has only a single predecessor instruction. We call this sequence the jump prolog. The prolog is located by scanning backwards from the jump instruction until we find an instruction that has more than one entry point. Notice that the prolog can consist of multiple basic blocks.

Figure 3:
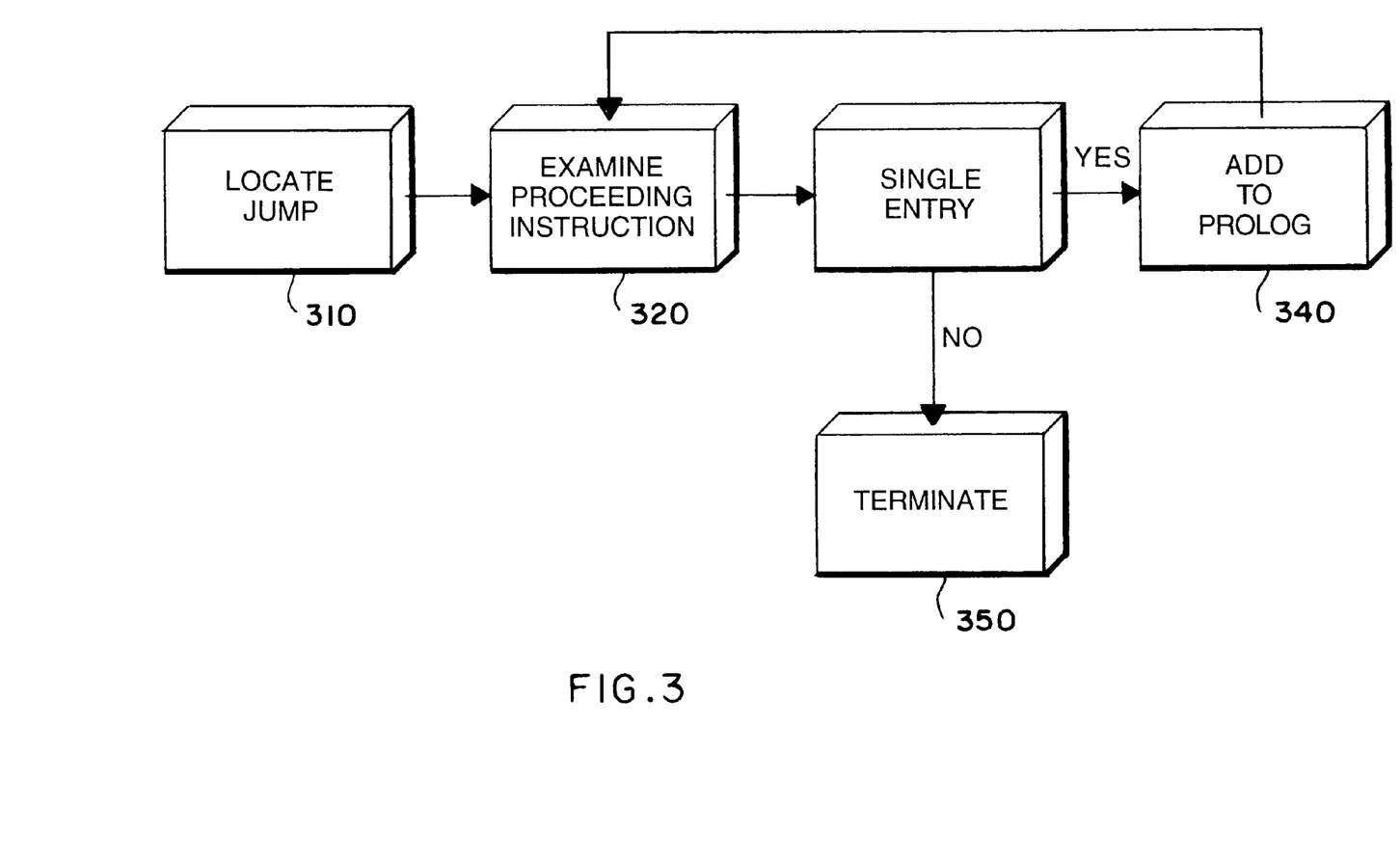
FIG. 3 is a flow diagram of steps to locate a prolog sequence.

As shown in FIG. 3, once the jump instruction is identified by its "opcode" in step 310, each preceding instruction is examined in turn, step 320. Determine whether the instruction has a single entry point in step 330. If so, add the instruction to the prolog in step 340, otherwise terminate in step 350.

Step 2—Identify Candidate Registers

In the prolog 102, we try to identify a set of candidate registers which are likely to include the correct index register. The candidate registers are analyzed in step 3 to determine the index register 110.

Figure 4:
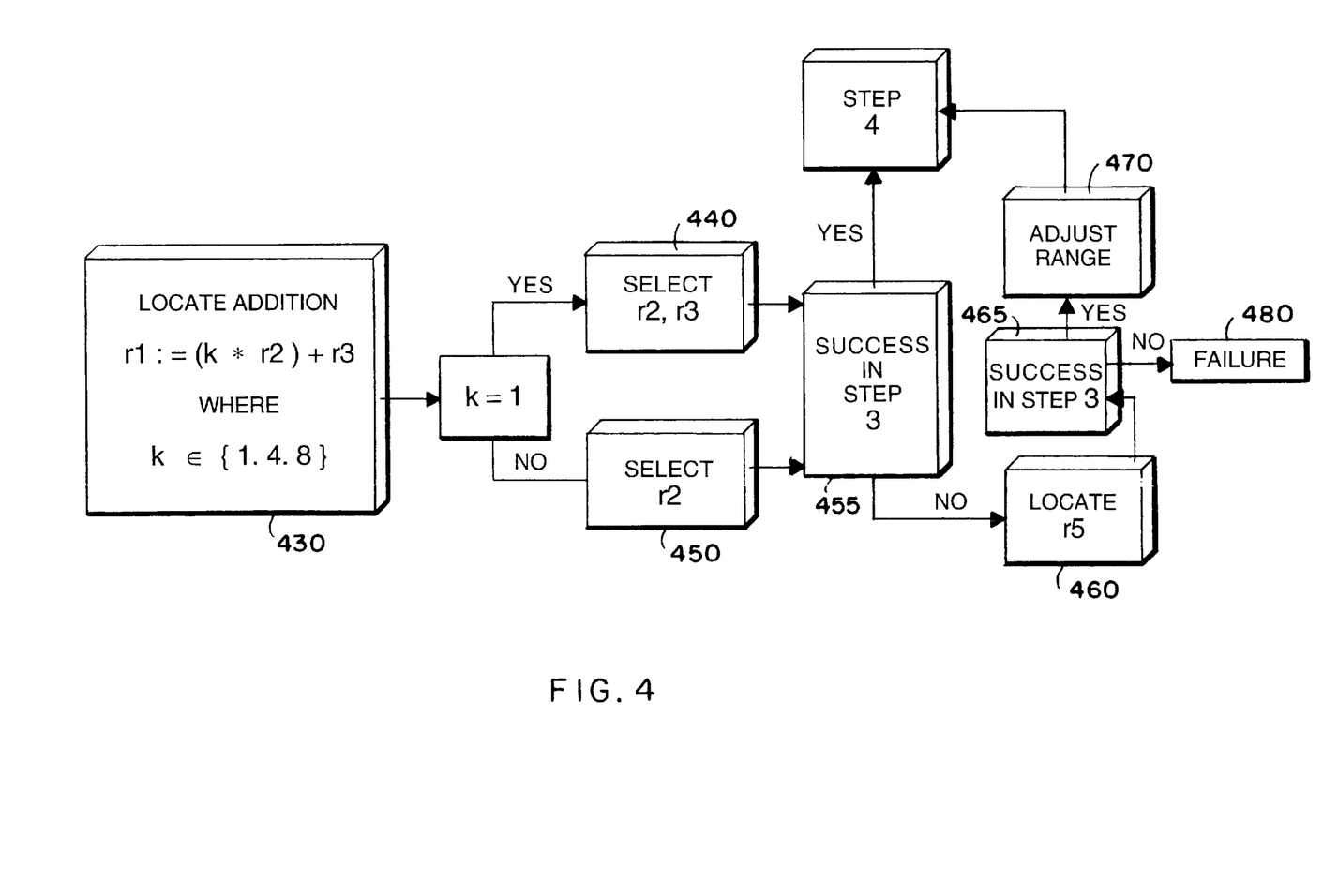
FIG. 4 is a flow diagram of steps to identify candidate registers.

Therefore, as shown in FIG. 4, beginning at the indirect branch 100, we look backwards in the jump prolog 102, step 430, to find instruction 101 which performs an addition of the general form:

$$r1:=(k*r2)+r3$$

Here, the values of "k" are in the interval $\{1, 4, 8\}$ and "r1" is used in the load instruction 103 to read the destination address out of the jump table 115. The values of "k" test various forms that could be used for the jump table entries, i.e., conventionally, the entries in the jump table are byte, word, or long-word aligned. If "k" is 1, then we select both "r2" and "r3" as candidate registers (440), else we treat just "r2" as the candidate register (450). If step 3 succeeds (455), then continue with step 4.

Otherwise, if step 3 does not succeed for the candidate registers "r" selected in steps 440 or 450, as described below, then we check whether or not the candidate register value was produced by adding or subtracting a constant to a fourth register, "r5," step 460. If so, we also treat "r5" as a candidate, and if the step 3 analysis on "r5" succeeds (465), then we adjust the range of values determined by step 3 suitably, step 470 and continue with step 4. Otherwise, the process fails in step 480.

Step 3—Determine Index Range

Figure 5:
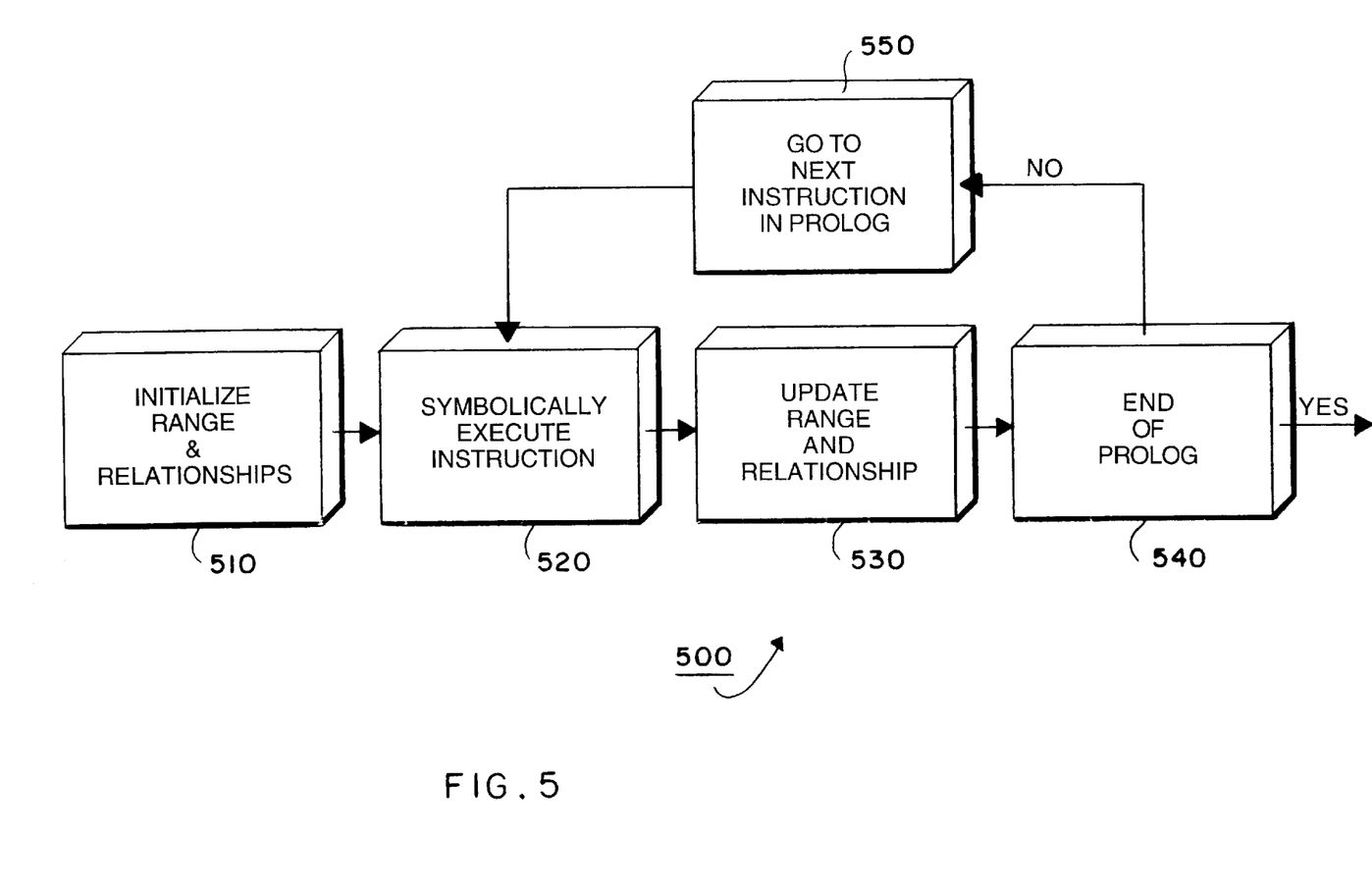
FIG. 5 is a flow diagram of steps to determine index ranges.

As shown in FIG. 5, the sub-steps 500 determine the set of possible index values for each candidate register "c." Our analysis exploits the fact that compilers typically emit comparisons that check whether or not the index for a computed jump is within the range of the jump table. Our analysis uses these comparisons to derive the legal range for the index value of the candidate register "c." We will motivate our techniques with a typical example of such comparisons in an example jump prolog:

Example Prolog 1. r:=c<10
2. branch out of jump prolog if !r
3. r:=c<0
4. branch out of jump prolog if r . . .

Our goal is to determine that "0<=value(c)<10" when execution proceeds through the jump prolog. We use forward symbolic execution in step 520 of the jump prolog to determine the set of values for the candidate register "c." The candidate register value is maintained as a set of integral ranges in step 530. Initially, the range of "c" is set to [minint, maxint] in step 510. Additionally, for every non-candidate register "r," we store the relationship between the register and "c." Initially, these relationships are set to be undefined in step 510.

We maintain a set of ranges as the value for "c" instead of a single range because we update the value by intersecting and subtracting a new range value from an old value, and subtracting may produce multiple ranges in step 530. For each non-candidate register "r," we store the relationship between "r" and "c' in step 530. This stage terminates when the end of the prolog is reached in step 540, otherwise the next instruction is selected in step 550.

The possible relationships are:

(i) add(k):
  "value(r)=value(c)+k,"
    where "k" is a constant;
(ii) inrange(k, k2):
  "value(r)=true iff k1<=value(c)<=k2,"
    for some constants "k1" and "k2;"
(iii) outrange(k, k2):
  "value(r)=false iff k1<=value(c)<=k2,"
    for some constants ""k1" and "k2;"
(iv) constant(k):
  "value(r)=k,"
    where "k" is a constant; or
(v) undef:
  the relationship between "r" and "c" is unknown.

The forward symbolic execution handles three types of instructions:

(a) instructions that modify the candidate register;
(b) instructions that modify other registers;
(c) branches out of the jump prolog.

In step 520, the type of instruction is also identified and symbolically executed, and in step 530 the ranges and relationships are adjusted accordingly as described below.

Instructions that Modify the Candidate Register

If an instruction of type (a) adds a constant "m" to "c", then we increment the ranges associated with "c," and suitably change the relationships of other registers to "c." For all other modifications of "c," we set the relationships to "undef." If we can determine the new range for "c" from the type of instruction, then we record that range as the value for "c." Else, we reset the value of "c" to [minint, maxint].

Pseudo code which implements this is shown in Table A.

TABLE A for each register r that is not c
    if relationship [r] is add(k) then
        relationship [r] = add(k−m)
    else if relationship [r] is inrange ($k_1$, $k_2$) then
        relationship [r] = inrange ($k_1$ + m, $k_2$ + m)
    else if relationship [r] is outrange ($k_1$, $k_2$) then
        relationship [r] = outrange ($k_1$ + m, $k_2$ + m)
    else leave relationship [r] unchanged Instructions that Modify other Registers Now let us consider instructions that modify a non-candidate register "r." If the modification computes a relationship to "c," then we record the new relationship between "r" and "c." For example, after instruction 1 in the Example Prolog, we set the relationship for "r" to inrange(minint, 9).

Otherwise, if the candidate instruction is of the form "r:=s+m," where register "s" is not "c,", and "m" is a constant, possibly zero, then we use the relationship between "s" and "c" to determine the relationship between "r" and "c." Otherwise, we set the relationship for "r" to "undef."

Pseudo code which implements this is shown in Table B.

TABLE B

```
if m = 0 then
    relationship [r] is relationship [s]
else if relationship [s] is add(k) then
    relationship [r] = add(k + m)
else if relationship [s] is constant (k) then
    relationship [r] = constant (k + m)
else
    relationship [r] = undefined
```

Jump out of the Prolog

If an instruction branches out of the jump prolog based on the value of a register "r" and where we have recorded a relationship between "r" and "c," then we update the set of ranges for "c." For example, after instruction 2 of the Example Prolog, the range of "c" can be set to [minint, 9]. After instruction 4, the range for "c" is intersected with the range [0, maxint] to produce a new range [0, 9]. Pseudo code which implements this is shown in Table C.

TABLE C

```
if relationship [r] is inrange (k₁, k₂) then
    if branching out of jump prolog when r is true then
        ranges [c] = ranges [c] - {(k₁, k₂)}
    else if branches out of jump prolog when r is false then
        ranges [c] = ranges [c] intersect {(k₁, k₂)}
else if relationship [r] is outrange (k₁, k₂) then
    if branching out of jump prolog when r is true then
        ranges [c] = ranges [c] intersect {(k₁, k₂)}
    else if branching out of jump prolog when r is false then
        ranges [c] = ranges [c] - {(k₁, k₂)}
else if relationship [r] is add(k) then
    if branching out of jump prolog when r < 0 then
        ranges [c] = ranges [c] intersect {[-∞, -k - 1]}
    else if branching out of jump prolog when r ≦ 0 then
        ranges [c] = ranges [c] intersect {[-∞, -k]}
    else if branching out of jump prolog when r > 0 then
        ranges [c] = ranges [c] intersect {[-k + 1, +∞]}
    else if branching out of jump prolog when r ≧ 0 then
        ranges [c] = ranges [c] intersect {[-k, +∞]}
    else if branching out of jump prolog when r = 0 then
        ranges [c] = ranges [c] - {[-k, -k]}
    else if branching out of jump prolog when r ≠ 0 then
        ranges [c] = ranges [c] intersect {[-k, -k]}
    else
        ranges [c] is not changed
else
    ranges [c] is not changed
```

When the forward symbolic executions is complete, we will have determined a set of ranges for the value contained in "c." If this set consists of a single contiguous range, then step 3 succeeds and we assume that "c" is the index register, and its value can fall anywhere within the determined range. Otherwise, we try another candidate register because jump tables emitted by most compilers usually cover a single contiguous range of indices, instead of having holes that correspond to missing pieces of a contiguous range.

Step 4—Locate Jump Table

Figure 6:
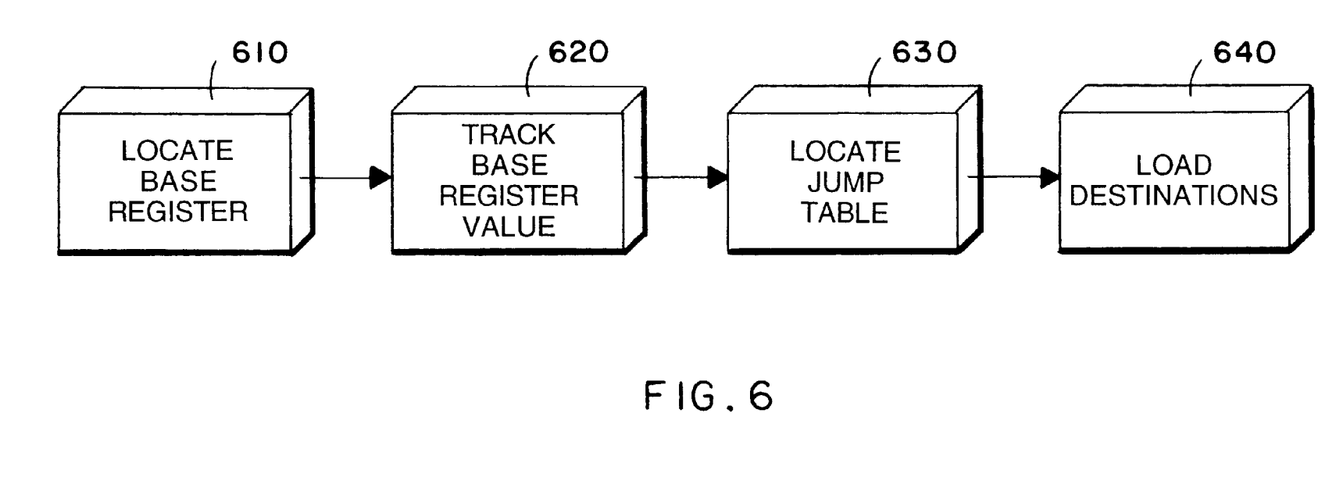
FIG. 6 is a flow diagram of step to read a jump table.

In addition to locating the register that is used to index into the jump table, it is also necessary to locate the register that stores the base address of either the jump table or the jump destination, i.e., the base register. We determine the value of this base register by another symbolic execution of the jump prolog as shown in FIG. 6.

We locate the base register in step 610 as follows. Recall, in step 2 above, we found an instruction 101 that added the index register to another register. This other register is the base register.

In step 620 of this symbolic execution, we track the value of the base register by interpreting instructions that load addresses into the base register, and add constants to the base register. Given the value of the base register and a range for the index register, we can either find the jump table in step 630, and load all possible destinations of the jump from this table in step 640, or directly compute the destination when no jump table is used.

Figure 7:
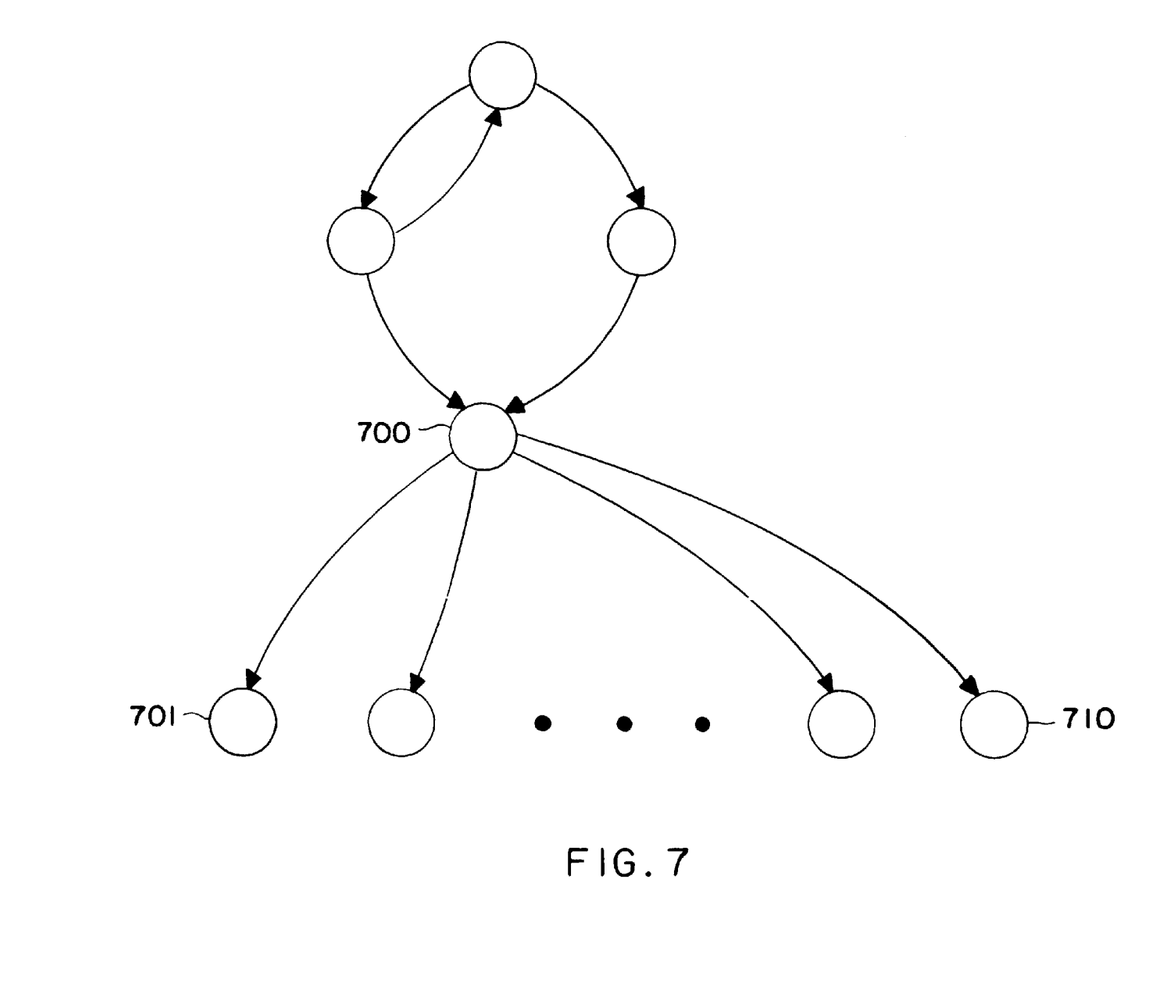
FIG. 7 is a control flow graph including nodes reached by computed indirect jumps constructed according to the invention.

Our method does not require source code, or additional compiler generated information that enumerates the targets of indirect computed jumps. Nor does our method require prior knowledge of the jump table. The method can be used to discover missing portions of a control flow graph as shown in FIG. 7, for example, nodes 701–710 are reached by an indirect computed branch 700.

It is understood that the above-described embodiments are simply illustrative of the principles of the invention. Various other modifications and changes may be made by those skilled in the art which will embody the principles of the invention and fall within the spirit and scope thereof.

We claim:

1. A computerized method for determining destination addresses of an indirect computed branch instruction, comprising the steps of:

locating a prolog sequence of instructions immediately preceding the indirect computed branch instruction;

identifying candidate registers;

determining a range of index values for each candidate register to select an index register;

identifying a base register of a jump table to which the range of the index values of the index register is added to locate possible destination addresses stored in entries of the jump table.

2. The method of claim 1 wherein the prolog sequence of instructions is located by scanning backwards from the indirect computed branch instruction.

3. The method of claim 2 wherein the scanning terminates at an instruction that has more than one predecessor instruction.

4. The method of claim 1 wherein candidate registers are identified by locating range check instructions.

5. The method of claim 4 wherein candidate registers are operands of instructions which perform an addition of the general form $r1:=(k*r2)+r3$ where r1 is used in the indirect computed branch instruction.

6. The method of claim 5 wherein k has values in the interval $\{1, 4, 8\}$.

7. The method of claim 6 wherein the candidate registers are r2 and r3 if k=1, and r2 otherwise.

8. The method of claim 5 wherein one of the candidate register values is produced by adding a constant to a fourth register r5.

9. The method of claim 1 wherein the range of index values for each candidate register is determined by a forward symbolic execution of the prolog.

10. The method of claim 9 wherein old values of a particular range are intersected with new values of the particular range.

11. The method of claim 9 wherein the relationship of the range of index values to each non-candidate register is determined.

12. The method of claim 9 wherein the forward symbolic execution identifies instructions that modify the candidate registers, instructions that modify other registers, and instructions that branch out of the prolog sequence of instructions.

13. The method of claim 9 wherein the index register is selected from the candidate register having a single contiguous range of index values when the forward symbolic execution completes.

14. The method of claim 1 wherein the content of the base register is tracked using forward symbolic execution of the prolog sequence of instructions.

15. The method of claim 1 wherein the destination addresses are used to construct a control flow graph.

16. The method of claim 4 wherein candidate registers are operands of instructions which perform an addition of the general form $$r1:=(k*r2)+r3$$

where r1 is used to load an address used in the indirect computed branch instruction.

* * * * *